United States Patent
Tervo et al.

(10) Patent No.: US 12,407,550 B2
(45) Date of Patent: Sep. 2, 2025

(54) SUPPORTING VARIOUS CONSTELLATIONS

(71) Applicant: Nokia Technologies Oy, Espoo (FI)

(72) Inventors: Oskari Tervo, Oulu (FI); Esa Tapani Tiirola, Kempele (FI); Kari Pekka Pajukoski, Oulu (FI)

(73) Assignee: Nokia Technologies Oy, Espoo (FI)

( * ) Notice: Subject to any disclaimer, the term of this patent is extended or adjusted under 35 U.S.C. 154(b) by 3 days.

(21) Appl. No.: 18/260,094

(22) PCT Filed: Jan. 8, 2021

(86) PCT No.: PCT/EP2021/050280
§ 371 (c)(1),
(2) Date: Jun. 30, 2023

(87) PCT Pub. No.: WO2022/148544
PCT Pub. Date: Jul. 14, 2022

(65) Prior Publication Data
US 2024/0056337 A1    Feb. 15, 2024

(51) Int. Cl.
*H04L 27/00*    (2006.01)
*H04L 1/00*    (2006.01)
*H04L 5/00*    (2006.01)

(52) U.S. Cl.
CPC ........ *H04L 27/0012* (2013.01); *H04L 1/0025* (2013.01); *H04L 1/0026* (2013.01); *H04L 5/0091* (2013.01); *H04L 27/0008* (2013.01)

(58) Field of Classification Search
CPC . H04L 27/0012; H04L 1/0025; H04L 1/0026; H04L 5/0091; H04L 27/0008; H04L 1/0003; H04L 1/0009; H04L 1/0016; H04L 27/34

USPC .................................................. 375/219, 262
See application file for complete search history.

(56) References Cited

U.S. PATENT DOCUMENTS

| | | | |
|---|---|---|---|
| 10,862,553 B1* | 12/2020 | Kim | H04L 1/0003 |
| 11,133,896 B2* | 9/2021 | Wei | H04W 76/11 |
| 2017/0331662 A1* | 11/2017 | Sun | H04J 11/004 |
| 2019/0020440 A1* | 1/2019 | Santhanam | H04L 1/1614 |
| 2019/0173726 A1* | 6/2019 | Wong | H04L 27/3405 |
| 2019/0386867 A1* | 12/2019 | Liu | H04L 27/36 |
| 2020/0028617 A1* | 1/2020 | Landis | H04L 1/0003 |
| 2020/0076537 A1* | 3/2020 | Sun | H04J 11/005 |
| 2020/0351008 A1* | 11/2020 | Shao | H04L 1/0009 |
| 2021/0013991 A1* | 1/2021 | Park | H04L 5/0091 |
| 2021/0243789 A1* | 8/2021 | Fan | H04L 1/0084 |
| 2021/0288782 A1* | 9/2021 | Horn | H04W 52/0229 |
| 2021/0368539 A1* | 11/2021 | Zewail | H04W 74/0833 |
| 2022/0014411 A1* | 1/2022 | Baligh | H04L 25/067 |

(Continued)

*Primary Examiner* — Emmanuel Bayard
(74) *Attorney, Agent, or Firm* — Barta Jones, PLLC

(57) ABSTRACT

Embodiments of the present disclosure relate to devices, methods, apparatuses and computer readable storage media for supporting various constellations. According to embodiments of the present disclosure, a first device receives, from a second device, configuration information indicating at least one constellation available for a modulation and coding scheme, MCS. The first device receives, from the second device, control information for a communication between the first and second devices. The control information indicating the MCS. The first device performs the communication with the second device based on the control information using a constellation of the at least one constellation.

18 Claims, 10 Drawing Sheets

(56) References Cited

U.S. PATENT DOCUMENTS

| | | | |
|---|---|---|---|
| 2022/0131595 A1* | 4/2022 | Khan | H04L 1/203 |
| 2022/0141860 A1* | 5/2022 | Elshafie | H04W 72/23 |
| | | | 455/452.1 |
| 2023/0078737 A1* | 3/2023 | Haque | G06K 7/0008 |
| | | | 375/262 |
| 2023/0389018 A1* | 11/2023 | Nimbalker | H04W 72/232 |

* cited by examiner

SUPPORTING VARIOUS CONSTELLATIONS

RELATED APPLICATION

This application was originally filed as PCT Application No. PCT/EP2021/050280, filed on Jan. 8, 2023, of which is incorporated herein by reference in its entirety.

TECHNICAL FIELD

Embodiments of the present disclosure generally relate to the field of telecommunications, and in particular, to devices, methods, apparatuses and computer readable media for supporting various constellations.

BACKGROUND

Communication in the fifth generation (5G) communication system or new radio (NR) network is based on Quadrature Amplitude Modulation (QAM) modulation. In the case of QAM modulation, a constellation where Euclidean distances between the constellation points have been maximized is used. Although the QAM constellation is simple, it is known to be suboptimal, especially under different impairments such as a phase noise or a power amplifier (PA) non-linearity. In fact, the optimal constellation depends on various factors such as the phase noise, the PA non-linearity, a code rate, etc.

SUMMARY

In general, example embodiments of the present disclosure provide devices, methods, apparatuses and computer readable media for supporting various constellations.

In a first aspect, there is provided a first device. The first device comprises at least one processor and at least one memory including computer program codes. The at least one memory and the computer program codes are configured to, with the at least one processor, cause the first device to receive, from a second device, configuration information indicating at least one constellation available for a modulation and coding scheme, MCS; receive, from the second device, control information for a communication between the first and second devices, the control information indicating the MCS; and perform the communication with the second device based on the control information using a constellation of the at least one constellation.

In a second aspect, there is provided a second device. The second device comprises at least one processor and at least one memory including computer program codes. The at least one memory and the computer program codes are configured to, with the at least one processor, cause the second device to transmit, to a first device, configuration information indicating at least one constellation available for a modulation and coding scheme, MCS; transmit, to the first device, control information for a communication between the first and second devices, the control information indicating the MCS; and perform the communication with the first device based on the control information, a constellation of the at least one constellation being used in the communication.

In a third aspect, there is provided a method. The method comprises receiving, at a first device and from a second device, configuration information indicating at least one constellation available for a modulation and coding scheme, MCS; receiving, from the second device, control information for a communication between the first and second devices, the control information indicating the MCS; and performing the communication with the second device based on the control information using a constellation of the at least one constellation.

In a fourth aspect, there is provided a method. The method comprises transmitting, from a second device to a first device, configuration information indicating at least one constellation available for a modulation and coding scheme, MCS; transmitting, to the first device, control information for a communication between the first and second devices, the control information indicating the MCS; and performing the communication with the first device based on the control information, a constellation of the at least one constellation being used in the communication.

In a fifth aspect, there is provided an apparatus. The apparatus comprises means for receiving, from a further apparatus, configuration information indicating at least one constellation available for a modulation and coding scheme, MCS; means for receiving, from the further apparatus, control information for a communication between the apparatus and further apparatus, the control information indicating the MCS; and means for performing the communication with the further apparatus based on the control information using a constellation of the at least one constellation.

In a sixth aspect, there is provided an apparatus. The apparatus comprises means for transmitting, to a further apparatus, configuration information indicating at least one constellation available for a modulation and coding scheme, MCS; means for transmitting, to the further apparatus, control information for a communication between the further apparatus and the apparatus, the control information indicating the MCS; and means for performing the communication with the further apparatus based on the control information, a constellation of the at least one constellation being used in the communication.

In a seventh aspect, there is provided a computer program product that is stored on a computer readable medium and includes machine-executable instructions. The machine-executable instructions, when being executed, cause a machine to perform the method according to the above third or fourth aspect.

In an eighth aspect, there is a computer readable storage medium comprising program instructions stored thereon. The instructions, when executed by an apparatus, cause the apparatus to perform the method according to the above third or fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
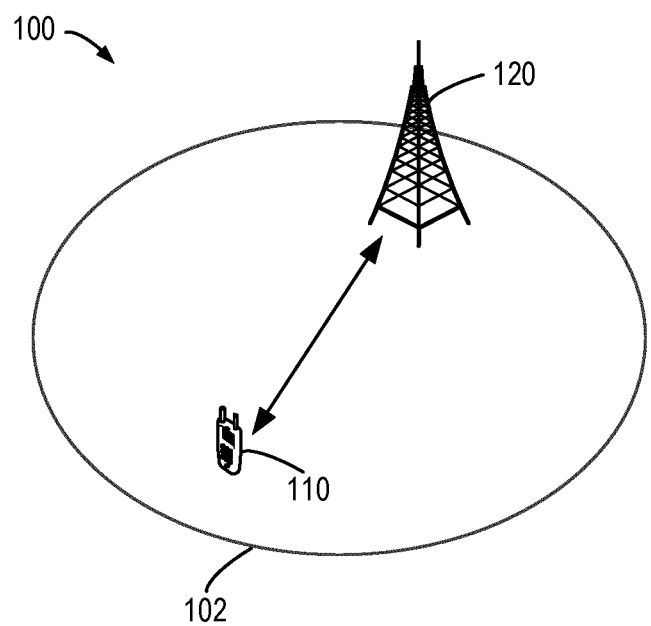
FIG. 1 shows an example communication network in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75 G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay node, a low power node such as a femto, a pico, and so forth, depending on the applied terminology and technology. An example of the relay node may be an Integrated Access and Backhaul (IAB) node. A distributed unit (DU) part of the IAB node may perform the functionalities of "network device" and thus can operate as the network device. In the following description, the terms "network device", "BS", and "node" may be used interchangeably.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a relay node, a device operating on commercial and/or industrial wireless networks, and the like. A Mobile Termination (MT) part of the IAB node may perform the functionalities of "terminal device" and thus can operate as the terminal device. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

As briefly discussed above, the optimal constellation depends on various factors such as the phase noise, the PA non-linearity, and the code rate. In the future and especially for communication at mmWave/THz frequencies, the transceiver impairments such as the phase noise and PA non-linearity will be some of the main challenges. Therefore, it is desirable to adapt the constellation depending on different cases.

As known, for example Advanced Television Systems Committee (ATSC) standard specifies 12 different constellations for 64-point modulation, and a used constellation is selected depending on the used code rate. For example, for a low code rate, it is optimal to use such a constellation where some of the constellation points are very close each other or almost overlapping, because the redundant bits used in the low coding rate can be used to recover the correct point in the receiver. Similarly, ATSC standard supports lots of constellations for each modulation order.

Although ATSC standard specifies different constellations which depend on the code rate, this kind of solution is impractical to be used as a mandatory solution in 5G communication system or a future cellular generation. The main reason is that it would then require all UEs to support different constellations. This is not a reasonable approach especially in the near future due to the complexity and memory constraints of certain applications. To this end, it is expected that supporting different constellations for a certain modulation order would be an optional feature for the UE.

Moreover, the optimal constellation may also depend on algorithms used at a receiver. An increasing trend is to search for solutions that would be compatible with various machine learning algorithms at the receiver, such as a gNB receiver.

In view of the above, the main problem is how to bring various constellations to the standard in a simple and practical way so that some constellations would be optional.

Currently, in NR, different modulation and coding scheme (MCS) tables are defined for different use cases, e.g., for Enhanced Mobile Broadband (eMBB) and Ultra Reliable Low Latency Communication (URLLC). Table 1 shows an example MCS table defined for a particular scenario.

TABLE 1 an example MCS table

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

The gNB can indicate a MCS table selected from different MCS tables to a UE by a higher layer signalling. The selection of a MCS index in the selected MCS table can be communicated to the UE for each transmission and reception. Each MCS index $I_{MCS}$ is quantized by 5 bits and defines an effective code rate, a modulation order, and the resulting spectral efficiency (SE). For example, as shown in Table 1, the MCS index $I_{MCS}$ with a value "26" defines an effective code rate of 916.5/1024, a modulation order of 8 and the resulting SE of 7.1602.

The gNB can include the 5-bit IMGs field in downlink control information (DCI) triggering downlink (DL) reception or uplink (UL) transmission for an UE. Accordingly, the UE can read the 5-bit $I_{MCS}$ field in the DCI to determine the modulation order ($Q_m$) and the target code rate R.

The selection of the MCS index in NR is an implementation specific procedure. However, the Channel Quality Indicator (CQI) is defined in NR. The CQI index is reported by the UE to the gNB and can be used for the selection of the MCS index at the gNB. As such, MCS adaptation is enabled. Specifically, the UE can measure a channel quality using a channel state information (CSI) reference signal (RS). The UE can select the highest CQI index which still satisfies the target block error ratio (BLER) (typically 10%) based on the channel quality. The UE can report this CQI index to the gNB, as a part of the CSI. The BS can then change the MCS based on the reported CQI index.

As can be seen from the above, a set of available MCSs with predefined modulation orders/constellations and coding rates is defined in NR.

Meanwhile, in the ATSC standard, the constellation is fully tied to the code rate. That is, the code rate can be known based on the constellation, or vice versa.

Some straightforward solutions to support various constellations can be envisaged in view of the forgoing. However, such straightforward solutions would have some drawbacks. For example, in a straightforward solution, a constellation for each modulation order could be tied to the code rate. That is, the constellation could be directly known based on the MCS index (i.e., the code rate). However, this straightforward solution would require all UEs to support all constellations, increasing the complexity for all UEs and making a disruptive approach.

In another straightforward solution, similar MCS tables could be defined for different UE types. For example, a specific UE type could support a specific set of MCS tables. This straightforward solution would require some UE type to support the specific set of constellations/MCS tables. As a result, more MCS tables would be needed. This straightforward solution cannot give enough freedom to support some constellations, due to the hard-coded linkage between coding rate and constellation. The number of MCS tables would be excessive in order to support this straightforward solution. Moreover, this straightforward solution would increase the complexity of the UE as well as the related standardization effort.

Embodiments of the present disclosure propose a solution for supporting various constellations, so as to solve the above problems and one or more of other potential problems. In this solution, a second device (e.g., a network device) indicates to a first device (e.g., a terminal device) of at least one constellation available for a MCS. When performing a communication related to the MCS, the first device uses a constellation of the at least one constellation. The used constellation may be selected by the first device or the second device. The second device may indicate to the first device of constellations available for a plurality of MCSs, respectively. The number of constellations available for different MCSs having the same modulation order may vary from a MCS to another MCS. The constellations available for different MCSs having the same modulation order may also vary from a MCS to another MCS.

In this way, various constellations can be supported with minimum complexity. As such, the constellation used in communication can be optimized and adapted depending on various factors such as the phase noise or the PA nonlinearity. Moreover, the optimization of constellation is enabled separately for each modulation scheme and each coding rate, for example, as defined by the MCS tables.

Principle and implementations of the present disclosure will be described in detail below with reference to FIGS. 1-7.

FIG. 1 shows an example communication network 100 in which example embodiments of the present disclosure can be implemented. The communication network 100 includes a first device 110 and a second device 120 that can communicate with each other. In the example of FIG. 1, the first device 110 is illustrated as a terminal device, and the second device 120 is illustrated as a network device serving the terminal device 110. The serving area of the second device 120 is called as a cell 102. It is to be understood that the number of first devices, second devices and cells is only for the purpose of illustration without suggesting any limitations. The communication network 100 may include any suitable number of first devices, second devices and cells adapted for implementing embodiments of the present disclosure. Furthermore, the functionalities of the second device can be split into multiple network nodes, such as Transmission and Reception Points (TRPs), centralized unit (CU) and DU, etc. Although not shown, it would be appreciated that a plurality of first devices may be located in the cell 102 and served by the second device 120.

Communications in the communication network 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

In the network 100, the first device 110 and the second device 120 can communicate data and control information to each other. In the case where the first device 110 is the terminal device and the second device 120 is the network device, a link from the second device 120 to the first device 110 is referred to as a DL, while a link from the first device 110 to the second device 120 is referred to as a UL.

Figure 2:
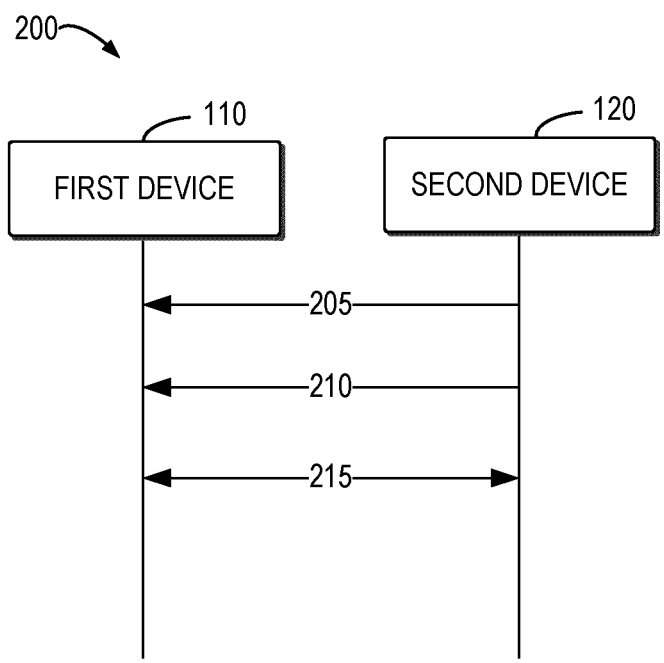
FIG. 2 illustrates a schematic diagram of interactions between devices according to some example embodiments of the present disclosure.

FIG. 2 illustrates a schematic diagram of interactions 200 between devices according to some example embodiments of the present disclosure. For example, the interactions 200 involve the first device 110 and the second device 120 shown in FIG. 1.

As shown in FIG. 2, the second device 120 transmits 205, to the first device 110, configuration information indicating at least one constellation available for a MCS. The configuration information may be transmitted via a higher layer signalling, for example, a Radio Resource Control (RRC) signalling.

As used herein, the at least one constellation available for a specific MCS refers to a candidate constellation which can be used to transmit data or receive data along with a combination of modulation order and coding rate. In other words, the configuration information may indicate which constellation or constellations are active for the MCS and thus can be used for the MCS. In the following, the at least one constellation may be also referred to as "an available constellation" or "available constellations".

The configuration information may further indicate one or more constellations available for another MCS. That is, the configuration information may indicate constellations available for a group of MCSs. The available constellations may be different for different MCSs having the same modulation order. Alternatively, or in addition, the number of available constellations may be different for different MCSs.

In some example embodiments, the available constellation may be a new constellation to replace an existing constellation defined for the MCS. Replacement for different MCSs may be different. In some example embodiments, the available constellation may be an additional option for further selection by the first device 110 or the second device 120.

The available constellations may be indicated in a variety of ways. In some example embodiments, MCS indices of a MCS table may be used to indicate the available constellations. Accordingly, the configuration information may indicate a correspondence of the available constellations to a MCS index representing the MCS. In other words, the configuration information may indicate that the MCS index of the MCS table corresponds to the available constellations. For example, a new column may be added to the existing MCS table or a new type of MCS table may be defined. Table 2 shows an example MCS table with a column "constellation".

TABLE 2 an example MCS table with a column "constellation"

| MCS Index $I_{MCS}$ | Modulation Order $Q_m$ | Target code Rate R × [1024] | Spectral efficiency | constellation |
|---|---|---|---|---|
| 0 | q | 240/q | 0.2344 | R15 |
| 1 | q | 314/q | 0.3066 | R15 |
| 2 | 2 | 193 | 0.3770 | R15 |
| 3 | 2 | 251 | 0.4902 | R15 |
| 4 | 2 | 308 | 0.6016 | R15 |
| 5 | 2 | 379 | 0.7402 | R15 |
| 6 | 2 | 449 | 0.8770 | R15 |
| 7 | 2 | 526 | 1.0273 | R15 |
| 8 | 2 | 602 | 1.1758 | R15 |
| 9 | 2 | 679 | 1.3262 | R15 |
| 10 | 4 | 340 | 1.3281 | R15 |
| 11 | 4 | 378 | 1.4766 | R15 |
| 12 | 4 | 434 | 1.6953 | Configuration information |
| 13 | 4 | 490 | 1.9141 | Configuration information |
| 14 | 4 | 553 | 2.1602 | Configuration information |
| 15 | 4 | 616 | 2.4063 | R15 |

In the above example MCS table, the MCS indices 0-11 and 15 correspond to a default constellation, which is represented by "R15". The MCS indices 12-14 correspond to the available constellations as indicated in the configuration information. For example, if the second device 120 selects the above example MCS table for the first device 110, the second device 120 may indicate the available constellations corresponding to the MCS indices 12-14 via the RRC signalling.

It is to be understood that the available constellations and/or the number of available constellations may be different for different MCS indices having the same modulation order. For example, MCS index 12 of Table 2 may correspond to constellation A, while MCS index 13 of Table 2 may correspond to constellation B and constellation C different from the constellation A. It is also to be understood that the number of available constellations may be different for different MCS indices.

In some example embodiments, a MCS index may correspond to a unique available constellation. In some example embodiments, a plurality of MCS indices may correspond to the same available constellation. For example, MCS indices 12-13 of Table 2 may correspond to constellation A. In some example embodiments, a MCS index may correspond to a plurality of available constellations. For example, MCS index 14 of Table 2 may correspond to constellation A, constellation B and constellation C. These constellations may be defined by specifications. Alternatively, these constellations may not be defined by the specifications. In the latter case, it can be e.g. up-to the second device 120 to define the constellations. Selection and generation of these constellations will be described below with reference to FIG. 3.

In such example embodiments, a new constellation behavior for at least one MCS index ($I_{MCS}$) of the MCS table is provided. In this way, the modulation order can be kept unchanged. Moreover, the target code rate and spectral efficiency can be also kept unchanged.

Alternatively, or in addition, in some example embodiments, CQI indices of a CQI table may be used to indicate the available constellations and/or to address the properties of the measured channel via the configured constellations. Generally, after receiving a CQI index reported by the first device 110 (e.g., a UE), the second device 120 (e.g., a gNB) may derive a corresponding MCS index from the CQI index. The second device 120 can then configure the available constellations for CQI indices of a CQI table and/or to determine a channel quality based on the configured constellations.

Accordingly, the configuration information may indicate a correspondence of the available constellations to a CQI index for deriving a MCS index representing the MCS. In other words, the configuration information may indicate that the CQI index of the CQI table corresponds to the available constellations. For example, a new column may be added to the existing CQI table or a new type of CQI table may be defined. Table 3 shows an example CQI table with a column "constellation".

TABLE 3 an example CQI table with a column "constellation"

| CQI Index | modulation | code rate × [1024] | efficiency | constellation |
|---|---|---|---|---|
| 0 | | Out of range | | |
| 1 | QPSK | 78 | 0.1523 | R15 |
| 2 | QPSK | 120 | 0.2344 | R15 |
| 3 | QPSK | 193 | 0.3770 | R15 |
| 4 | QPSK | 308 | 0.6016 | R15 |
| 5 | QPSK | 449 | 0.8770 | R15 |
| 6 | QPSK | 602 | 1.1758 | R15 |

TABLE 3-continued an example CQI table with a column "constellation"

| CQI Index | modulation | code rate × [1024] | efficiency | constellation |
|---|---|---|---|---|
| 7 | 16QAM | 378 | 1.4766 | R15 |
| 8 | 16QAM | 490 | 1.9141 | R15 |
| 9 | 16QAM | 616 | 2.4063 | R15 |
| 10 | 64QAM | 466 | 2.7305 | R15 |
| 11 | 64QAM | 567 | 3.3223 | Configuration information |
| 12 | 64QAM | 666 | 3.9023 | Configuration information |
| 13 | 64QAM | 772 | 4.5234 | Configuration information |
| 14 | 64QAM | 873 | 5.1152 | R15 |
| 15 | 64QAM | 948 | 5.5547 | R15 |

In the above example Table 3, the CQI indices 1-10 and 14-15 correspond to the default constellation "R15". The CQI indices 11-13 correspond to the available constellations as indicated in the configuration information. For example, the second device 120 may indicate the available constellations corresponding to the CQI indices 11-13 via the RRC signalling.

It is to be understood that the available constellations and/or the number of available constellations may be different for different CQI indices corresponding to the same modulation order. For example, CQI index 11 of Table 3 may correspond to constellation A, while CQI index 12 of Table 3 may correspond to constellation B and constellation C different from the constellation A. It is also to be understood that the number of available constellations may be different for different CQI indices.

In some example embodiments, a CQI index may correspond to a unique available constellation. In some example embodiments, a plurality of CQI indices may correspond to the same available constellation. For example, CQI indices 11-12 of Table 3 may correspond to constellation A. In some example embodiments, a CQI index may correspond to a plurality of available constellations. For example, CQI index 13 of Table 3 may correspond to constellation A, constellation B and constellation C.

In some example embodiments, the available constellations for the CQI table may not be configured explicitly but may be derived from the available constellations configured for the MCS table. Alternatively, in some example embodiments, the available constellations for the MCS table may not be configured explicitly but may be derived from the available constellations configured for the CQI table.

It is to be understood that Tables 2 and 3 are illustrated as examples without any limitation to the scope of the present disclosure. The second device 120 may configure any index with corresponding available constellations. Moreover, in order to indicate the available constellations, the configuration information may indicate constellation points of each available constellation.

Continuing with FIG. 2, the second device 120 transmits 210, to the first device 110, control information for a communication between the first device 110 and the second device 120. The control information indicates the MCS, which may be also referred to as the "indicated MCS" in the following. The control information may include the MCS index representing the MCS. For example, the control information may include the MCS index 12 of the above Table 2. The communication may be a transmission from the first device 110 to the second device 120 or a transmission from the second device 120 to the first device 110.

In the case where the first device 110 is a terminal device and the second device 120 is a network device, the control information may be downlink control information (DCI). The DCI may include the MCS index and a resource allocation grant for the communication. Specifically, if the communication is a UL transmission, the resource allocation grant may be a UL grant (such as DCI format 0_0, 0_1 or 0_2). If the communication is a DL reception, the resource allocation grant may be a DL assignment (such as DCI format 1_0, 1_1 or 1_2).

Then, the first device 110 performs 215 the communication with the second device 120 based on the control information using a constellation of the at least one constellation. In the following, the constellation used in the communication may be referred to as a "target constellation" for purpose of discussion with any limitation. If the communication is the UL transmission, the first device 110 may transmit data on a physical uplink shared channel (PUSCH) using the target constellation. If the communication is the DL reception, the first device 110 may receive data on a physical downlink shared channel (PDSCH) using the target constellation. The target constellation may be selected by the second device 120 from the available constellations and indicated to the first device 110. Alternatively, the target constellation may be selected by the first device 110 from the available constellations autonomously.

In some example embodiments, the configuration information may indicate a unique available constellation for the indicated MCS. For example, the configuration information may indicate that the MCS index corresponds to the unique available constellation. Accordingly, the unique available constellation may be directly used by the first device 110 to perform the communication. As an example, the configuration information may indicate that MCS index 12 of Table 2 corresponds to constellation A. If the control information includes the MCS index 12 of Table 2, the first device 110 may perform 215 the communication using the constellation A.

In some example embodiments, the configuration information may indicate a plurality of available constellations for the indicated MCS. For example, the configuration information may indicate that the MCS index corresponds to the plurality of available constellations. Accordingly, the target constellation may be selected from the plurality of available constellations by the second device 120 or the first device 110.

In some example embodiments, the second device 120 may select the target constellation from the plurality of available constellations. The second device 120 may select the target constellation based on a variety of factors, including but not limited to, the code rate, the power backoff, the subcarrier spacing, a signal to noise ratio (SNR), a rank, the waveform and the like. As an example, there may be two available constellations corresponding to the MCS index. One of the two available constellations may be better for a larger power backoff/higher transmit power, but the other of the two available constellations may be better for a smaller power backoff/lower transmit power. The second device 120 may derive the transmit power of the first device 110 from a power headroom report from the first device 110 and receive an indication of the power backoff from the first device 110. When scheduling a PUSCH transmission, the second device 120 may select the target constellation based on the derived transmit power and the received power backoff.

In such example embodiments, the control information transmitted 210 by the second device 120 may further include an indication of the constellation selected by the second device 120 for the indicated MCS. In the case where the first device 110 is a terminal device and the second device 120 is a network device, the DCI may include an additional field to indicate the selected constellation for the MCS index and/or CQI index.

As an example, MCS index 14 of Table 2 may correspond to constellation A, constellation B and constellation C. The second device 120 may select the constellation B based on for example the code rate, the power backoff, the subcarrier spacing and the like. The second device 120 may include in the control information an indication of the constellation B, such as an index of the constellation B.

In this way, the constellation used in the communication can be optimized and adapted according to a specific case. As such, the modulation performance and coverage can be optimized.

In some example embodiments, the communication may be a transmission from the first device 110 to the second device 120. The first device 110 may select the target constellation from the plurality of available constellations autonomously. That is, the first device 110 may be allowed to select a constellation suitable for the communication from the plurality of available constellations flexibly. The first device 110 may select the target constellation based on for example the transmit power, the actual value of the power backoff, or Maximum Power Reduction (MPR). For example, the first device 110 may select the constellation supporting the smallest power backoff or MPR for a given Error Vector Magnitude (EVM) requirement.

In such example embodiments, the first device 110 may transmit an indication of the selected constellation to the second device 120. The first device 110 may transmit this indication on a control channel from the first device 110 to the second device 120. Alternatively, the first device 110 may indicate the selected constellation by means of a data-associated control signalling to be multiplexed with data, since the data-associated control signalling is transmitted with a known modulation scheme.

In the case where the first device 110 is the terminal device and the second device 120 is the network device, the first device 110 may transmit the indication of the selected constellation on a physical uplink control channel (PUCCH). Alternatively, the first device 110 may indicate the selected constellation by means of a data-associated signalling to be multiplexed with PUSCH data.

In this way, the constellation used in the communication can be optimized and adapted according to a specific situation. As such, the modulation performance and coverage can be optimized.

With reference to FIG. 2, the interaction between devices is illustrated. In some example embodiments, the interaction between devices may comprise additional acts. Specifically, prior to the interaction 200, the first device 110 may indicate the second device 120 of its capability to support different constellations such that the available constellation configured by the second device 120 is supported by the first device 110.

Figure 3:
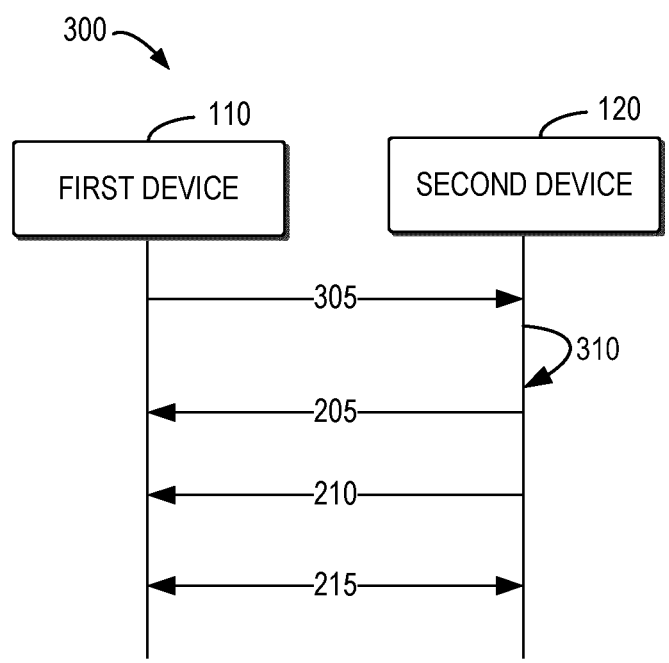
FIG. 3 illustrates a schematic diagram of interactions between devices according to some example embodiments of the present disclosure.

FIG. 3 illustrates a schematic diagram of interactions 300 between devices according to some example embodiments of the present disclosure. For example, the interactions 300 involve the first device 110 and the second device 120 shown in FIG. 1. Acts with the same reference signs (i.e., 205, 210, 215) as FIG. 2 are those described above with reference to FIG. 2 and thus description thereof is not repeated here.

As shown in FIG. 3, the first device 110 may transmit 305, to the second device 120, capability information indicating a capability of the first device 110 to support different constellations for at least one of data transmission and data reception. The capability information may indicate the capability of the first device 110 by any suitable manner. For example, the capability information may indicate a set of constellations supported by the first device 110 in addition to the default constellation (for example, a QAM constellation). To this end, the capability information may explicitly include constellation points of each of the constellation supported by the first device 110. Alternatively, or in addition, the capability information may include an index of each constellation supported by the first device 110. In the case where the first device 110 is the terminal device and the second device 120 is the network device, the capability of the first device 110 to support different constellations may be determined and indicated separately for DL transmission and UL reception.

In some example embodiments, the capability information may be transmitted via a RRC signalling. This may mean that the first device 110 (for example, an UE) can support a new constellation other than the default constellation only when the RRC connection has already been established.

After receiving the capability information from the first device 110, the second device 120 may determine 310 the least one constellation available for the MCS based on the capability information. In such example embodiments, the first device 110 first indicates the supported constellation(s) to the second device 120. The second device 120 can then configure the available constellation(s). For example, the second device 120 can adapt the MCS table(s) and/or the CQI table(s) accordingly.

In some example embodiments, based on the capability information, the second device 120 may select the available constellation from a set of predefined constellations for the MCS. For example, the set of predefined constellations may be specified in a technical specification or a standard.

The above approach is beneficial in a link direction from the first device 110 to the second device 120. For example, in the case where the first device 110 is the terminal device and the second device 120 is the network device, the above approach is beneficial in the UL direction. This is because it may require tighter regulations for testing for example EVM for different constellations.

In some example embodiments, the capability information may indicate a set of constellations supported by the first device 110. The second device 120 may select the available constellation from the indicated set of constellations. The selected available constellation may be a subset of the indicated set of constellations.

It is to be understood that if the capability of the first device 110 to support different constellations is indicated separately for data transmission and data reception, the available constellation may be selected separately for data transmission and data reception accordingly. For example, in the case where the first device 110 is the terminal device and the second device 120 is the network device, the second device 120 may select the available constellation from the predefined constellations separately for UL transmission and DL reception.

In such example embodiments, the flexibility for configuring the available constellation is increased. In this way, a more suitable constellation can be configured.

In some example embodiments, based on the capability information, the second device 120 may generate or define the available constellation for the MCS. The second device 120 may generate or define the available constellation for the MCS in any suitable manner. The embodiments of the present disclosure are not limited in this regard.

In this approach, the second device 120 can more flexibly optimize the constellation. This approach is beneficial in a link direction from the second device 120 to the first device 110. For example, in the case where the first device 110 is the terminal device and the second device 120 is the network device, this approach is beneficial in the DL direction. For example, the second device 120 may take into account the actual transmitter implementation and capabilities when defining the available constellations. The demodulation performance requirements for the first device 110 may be defined for different constellations or different types of constellation.

It is to be understood that if the capability of the first device 110 to support different constellations is indicated separately for data transmission and data reception, the available constellation may be defined separately for data transmission and data reception accordingly. For example, in the case where the first device 110 is the terminal device and the second device 120 is the network device, the second device 120 may define the available constellation separately for UL transmission and DL reception.

In such example embodiments, the flexibility for configuring the available constellation is further increased and even maximized. In this way, an optimized constellation can be configured.

As can be seen from the above description, the proposed solution has several benefits. For example, the solution can provide an optimized modulation performance and coverage depending on various factors such as the code rate, the PA non-linearity, phase noise properties, used numerology, etc. These benefits can be achieved with minimal and simple changes to the current communication system and adaptive modulation and coding can work as currently. Moreover, the optimization of constellation is enabled separately for each modulation scheme and each coding rate, for example, defined by the MCS tables.

Figure 4A:
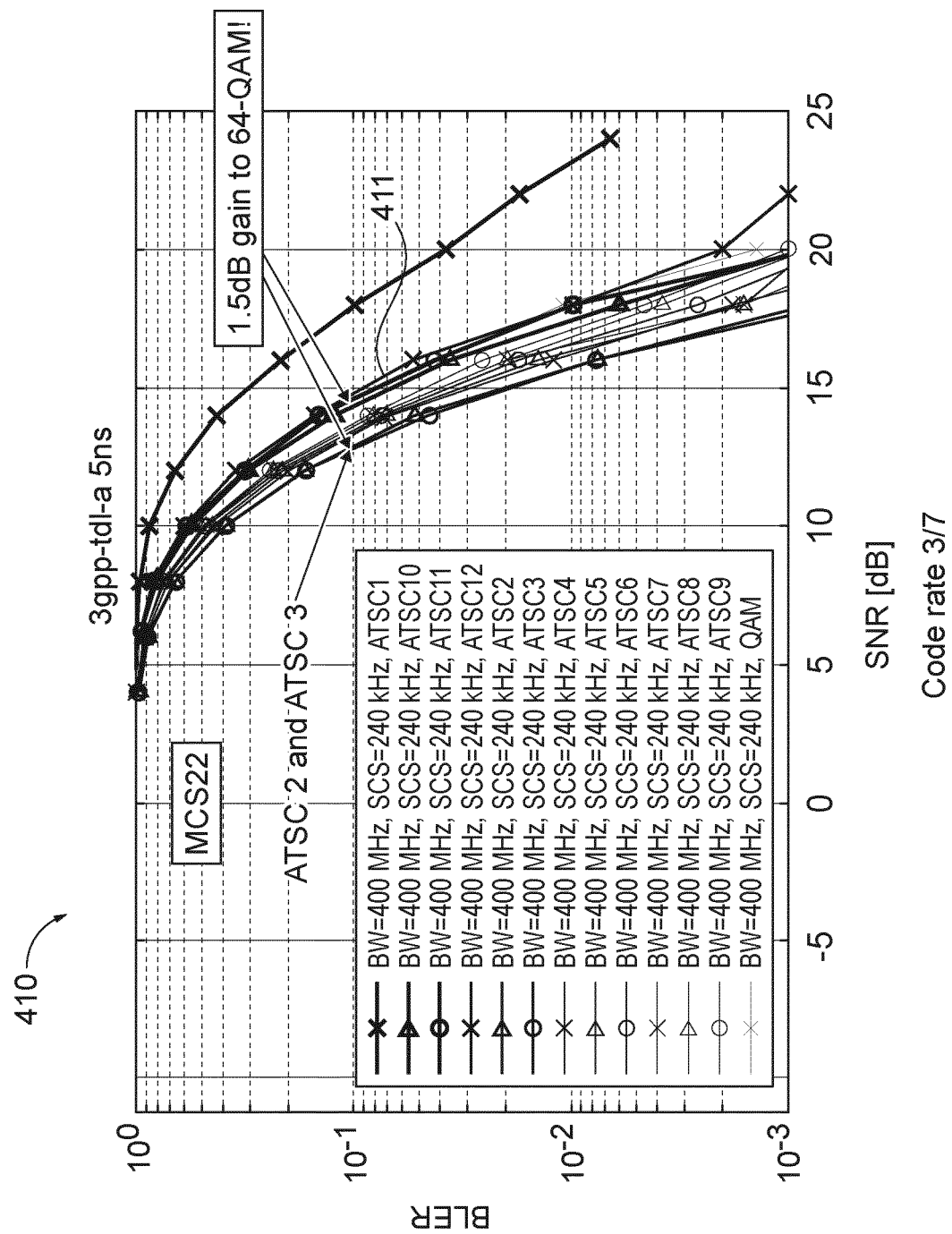
FIG. 4A illustrates performance gains provided by different constellations for a code rate according to some example embodiments of the present disclosure.
Figure 4B:
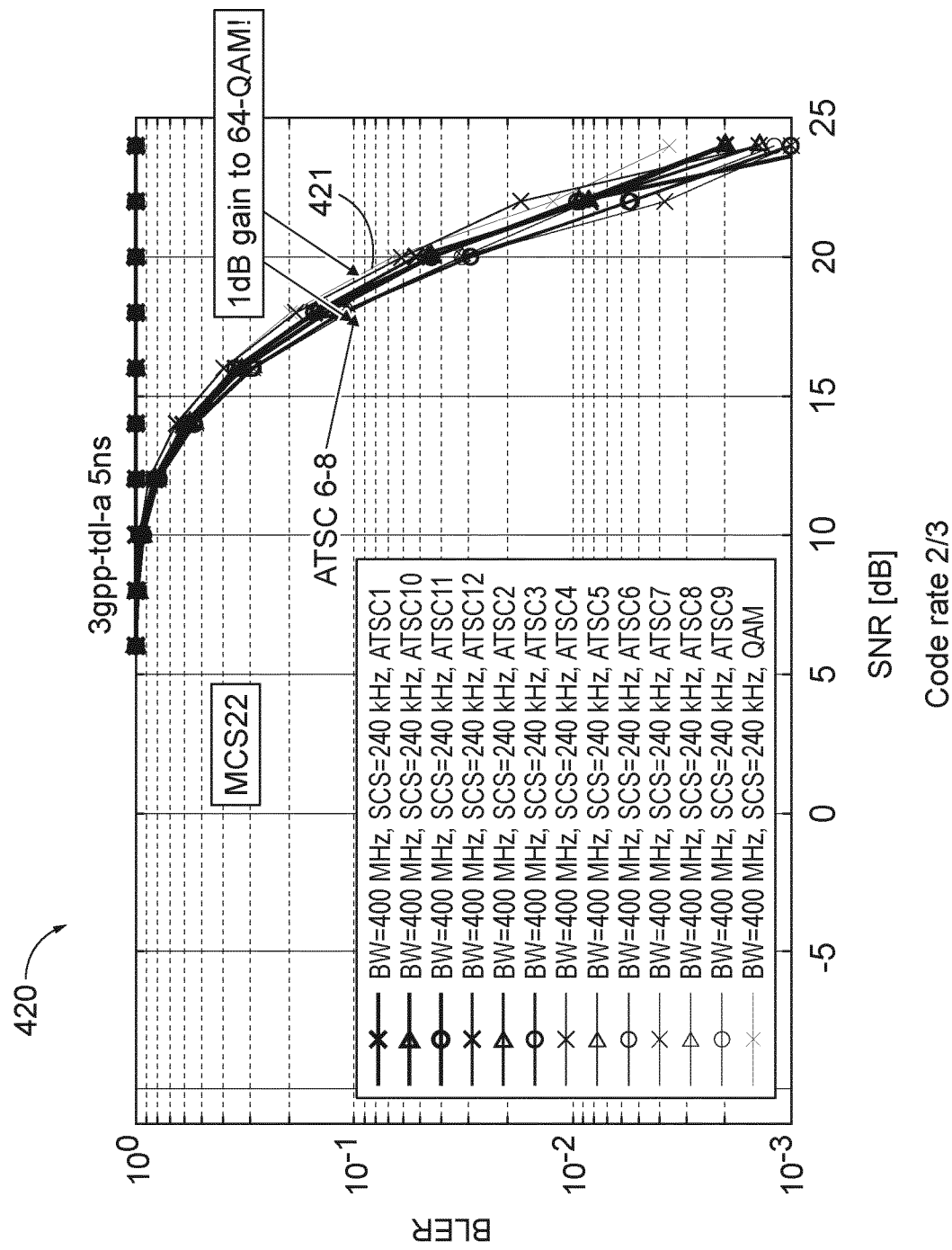
FIG. 4B illustrates performance gains provided by different constellations for another code rate according to some example embodiments of the present disclosure.
Figure 4C:
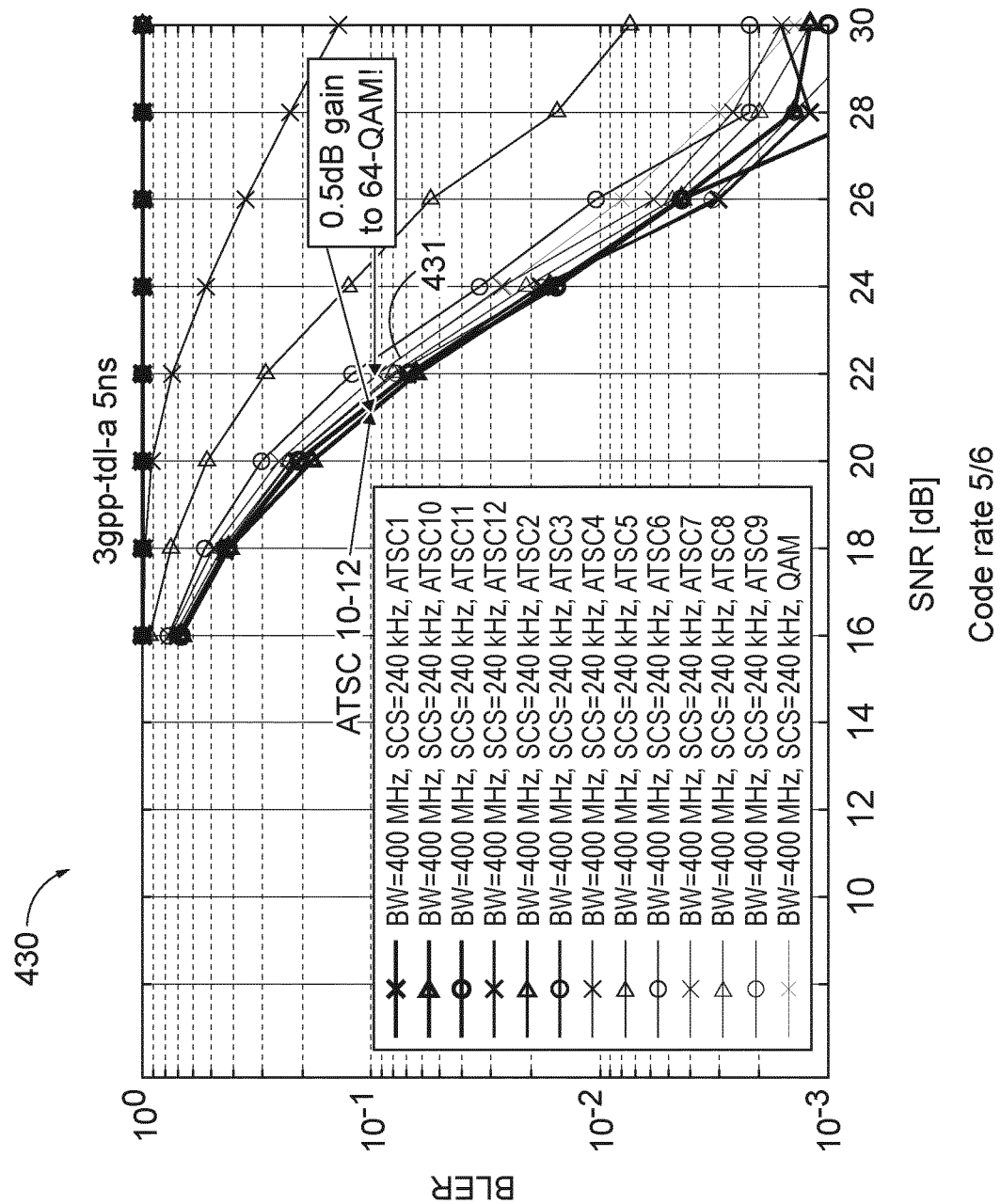
FIG. 4C illustrates performance gains provided by different constellations for a further code rate according to some example embodiments of the present disclosure.

FIGS. 4A-4C illustrate performance gains provided by different constellations for different code rates according to some example embodiments of the present disclosure. In the plot 410 of BLER versus SNR for the code rate 3/7, the curve 411 corresponds to the 64-QAM constellation, while the other curves (not labeled with a reference sign) correspond to constellations taken from ATSC 3.0 standard, which are denoted by ATSC 1 to 12. As can be seen from FIG. 4A, for the code rate 3/7, the best constellations are ATSC 2 and ASTC 3, which can provide 1.5 dB gains with respect to the 64-QAM constellation.

In the plot 420 of BLER versus SNR for the code rate 2/3, the curve 421 corresponds to the 64-QAM constellation, while the other curves (not labeled with a reference sign) correspond to ATSC 1 to 12. As can be seen from FIG. 4B, for the code rate 2/3, the best constellations are ATSC 6, ATSC 7 and ASTC 8, which can provide 1 dB gain with respect to the 64-QAM constellation.

In the plot 430 of BLER versus SNR for the code rate 5/6, the curve 431 corresponds to the 64-QAM constellation, while the other curves (not labeled with a reference sign) correspond to ATSC 1 to 12. As can be seen from FIG. 4C, for the code rate 5/6, the best constellations are ATSC 10, ATSC 11 and ASTC 12, which can provide 0.5 dB gain with respect to the 64-QAM constellation.

Both the phase noise and power amplifier distortions are considered in obtaining the plots 410, 420 and 430. As can be seen from FIGS. 4A-4C, the best constellation(s) depends on the code rate, and significant gains can be achieved over the 64-QAM constellation by changing the constellation used under different cases.

Figure 5:
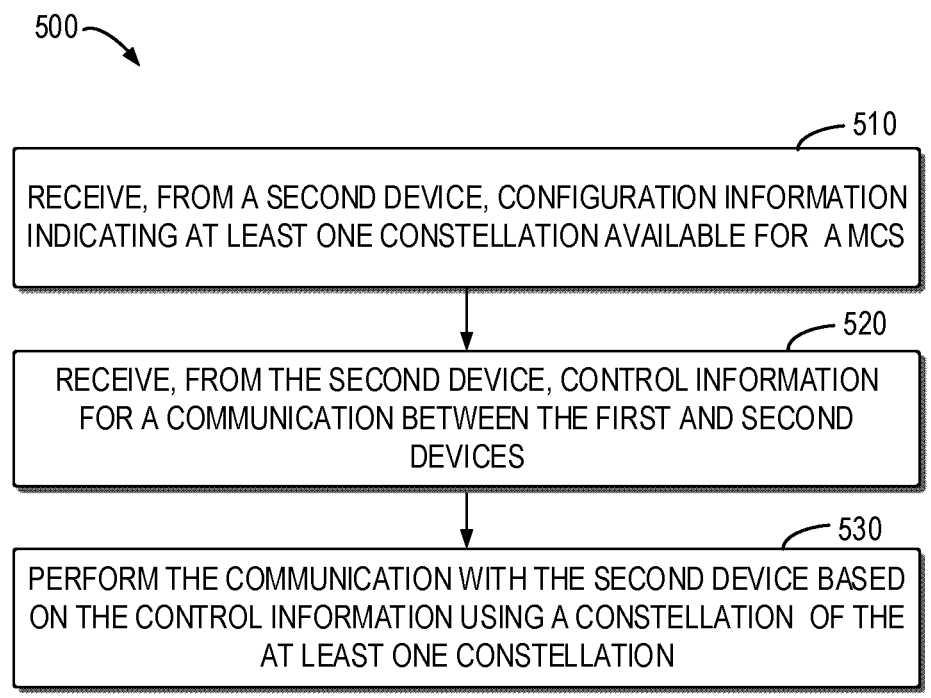
FIG. 5 illustrates a flowchart of an example method according to some example embodiments of the present disclosure.

FIG. 5 shows a flowchart of an example method 500 in accordance with some example embodiments of the present disclosure. The method 500 can be implemented at the first device 110 shown in FIG. 1. It is to be understood that the method 500 may include additional blocks not shown and/or may omit some shown blocks, and the scope of the present disclosure is not limited in this regard.

At block 510, the first device 110 receives, from a second device 120, configuration information indicating at least one constellation available for a MCS.

In some example embodiments, the configuration information may indicate a correspondence of the at least one constellation to at least one of: a MCS index representing the MCS, or a Channel Quality Indicator, CQI, index for deriving a MCS index representing the MCS.

At block 520, the first device 110 receives, from the second device 120, control information for a communication between the first and second device 120s. The control information indicates the MCS. At block 530, the first device 110 performs the communication with the second device 120 based on the control information using a constellation of the at least one constellation.

In some example embodiments, the first device 110 may select, from the at least one constellation, the constellation indicated in the control information for using in the communication.

In some example embodiments, the first device 110 may select the constellation from the at least one constellation autonomously for using in the communication. In some example embodiments, the first device 110 may transmit, to the second device 120, an indication of the selected constellation.

In some example embodiments, the first device 110 may transmit, to the second device 120, capability information indicating a capability of the first device 110 to support different constellations for at least one of data transmission and data reception. In some example embodiments, the at least one constellation may be selected by the second device 120 from a set of predefined constellations based on the capability information. In some example embodiments, the at least one constellation may be generated by the second device 120 based on the capability information. In some example embodiments, the capability information may indicates a set of constellations supported by the first device 110 and the at least one constellation may be selected by the second device 120 from the indicated set of constellations.

In some example embodiments, the first device 110 may be a terminal device and the second device 120 may be a network device serving the terminal device.

Figure 6:
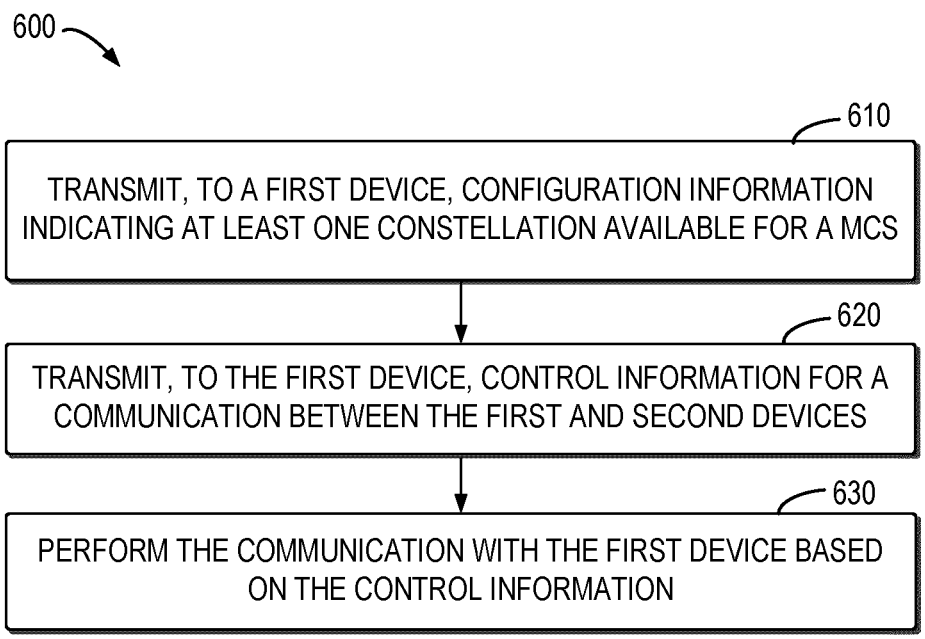
FIG. 6 illustrates a flowchart of an example method according to some example embodiments of the present disclosure.

FIG. 6 shows a flowchart of an example method 600 in accordance with some example embodiments of the present disclosure. The method 600 can be implemented at the second device 120 shown in FIG. 1. It is to be understood that the method 600 may include additional blocks not shown and/or may omit some shown blocks, and the scope of the present disclosure is not limited in this regard.

At block 610, the second device 120 transmits, to a first device 110, configuration information indicating at least one constellation available for a MCS.

In some example embodiments, the configuration information may indicate a correspondence of the at least one constellation to at least one of: a MCS index representing the MCS, or a Channel Quality Indicator, CQI, index for deriving a MCS index representing the MCS.

At block 620, the second device 120 transmits, to the first device 110, control information for a communication between the first and second device 120s. The control information indicates the MCS.

In some example embodiments, the second device 120 may select the constellation for using in the communication from the at least one constellation and transmit the control information comprising an indication of the selected constellation.

At block 630, the second device 120 performs the communication with the first device 110 based on the control information. A constellation of the at least one constellation is used in the communication.

In some example embodiments, the second device 120 may receive, from the first device 110, an indication of the constellation selected from the at least one constellation by the first device 110.

In some example embodiments, the second device 120 may receive, from the first device 110, capability information indicating a capability of the first device 110 to support different constellations for at least one of data transmission and data reception. In some example embodiments, the second device 120 may select the at least one constellation from a set of predefined constellations based on the capability information. In some example embodiments, the second device 120 may generate the at least one constellation based on the capability information. In some example embodiments, the capability information may indicate a set of constellations supported by the first device 110 and the second device 120 may select the at least one constellation from the indicated set of constellations.

In some example embodiments, the first device 110 may be a terminal device and the second device 120 may be a network device serving the terminal device.

In some example embodiments, an apparatus capable of performing the method 500 may comprise means for performing the respective steps of the method 500. The means may be implemented in any suitable form. For example, the means may be implemented in a circuitry or software module.

In some example embodiments, the apparatus capable of performing the method 500 (for example, the first device 110) comprises: means for receiving, from a further apparatus, configuration information indicating at least one constellation available for a modulation and coding scheme, MCS; means for receiving, from the further apparatus, control information for a communication between the apparatus and further apparatus, the control information indicating the MCS; and means for performing the communication with the further apparatus based on the control information using a constellation of the at least one constellation.

In some example embodiments, the configuration information indicates a correspondence of the at least one constellation to at least one of: a MCS index representing the MCS, or a Channel Quality Indicator, CQI, index for deriving a MCS index representing the MCS.

In some example embodiments, the apparatus further comprises means for selecting, from the at least one constellation, the constellation indicated in the control information for using in the communication.

In some example embodiments, the communication comprises transmission from the apparatus to the further apparatus, and the apparatus further comprises means for selecting the constellation from the at least one constellation autonomously for using in the communication.

In some example embodiments, the apparatus further comprises means for transmitting, to the further apparatus, an indication of the selected constellation.

In some example embodiments, the apparatus further comprises means for transmitting, to the further apparatus, capability information indicating a capability of the apparatus to support different constellations for at least one of data transmission and data reception.

In some example embodiments, the at least one constellation is selected by the further apparatus from a set of predefined constellations based on the capability information.

In some example embodiments, the at least one constellation is generated by the further apparatus based on the capability information.

In some example embodiments, the capability information indicates a set of constellations supported by the apparatus and the at least one constellation is selected by the further apparatus from the indicated set of constellations.

In some example embodiments, the apparatus is a terminal device and the further apparatus is a network device serving the terminal device.

In some example embodiments, an apparatus capable of performing the method 600 may comprise means for performing the respective steps of the method 600. The means may be implemented in any suitable form. For example, the means may be implemented in a circuitry or software module.

In some example embodiments, the apparatus capable of performing the method 600 (for example, the second device 120) comprises: means for transmitting, to a further apparatus, configuration information indicating at least one constellation available for a modulation and coding scheme, MCS; means for transmitting, to the further apparatus, control information for a communication between the further apparatus and the apparatus, the control information indicating the MCS; and means for performing the communication with the further apparatus based on the control information, a constellation of the at least one constellation being used in the communication.

In some example embodiments, the configuration information indicates a correspondence of the at least one constellation to at least one of: a MCS index representing the MCS, or a Channel Quality Indicator, CQI, index for deriving a MCS index representing the MCS.

In some example embodiments, the means for transmitting the control information comprises means for selecting the constellation for using in the communication from the at least one constellation; and means for transmitting the control information comprising an indication of the selected constellation.

In some example embodiments, the communication comprises transmission from the further apparatus to the apparatus, and the apparatus further comprises means for receiving, from the further apparatus, an indication of the constellation selected from the at least one constellation by the further apparatus.

In some example embodiments, the apparatus further comprises means for receiving, from the further apparatus, capability information indicating a capability of the further apparatus to support different constellations for at least one of data transmission and data reception.

In some example embodiments, the apparatus further comprises means for selecting the at least one constellation from a set of predefined constellations based on the capability information.

In some example embodiments, the apparatus further comprises means for generating the at least one constellation based on the capability information.

In some example embodiments, the capability information indicates a set of constellations supported by the further apparatus and the apparatus further comprises: means for selecting the at least one constellation from the indicated set of constellations In some example embodiments, the further apparatus is a terminal device and the apparatus is a network device serving the terminal device.

Figure 7:
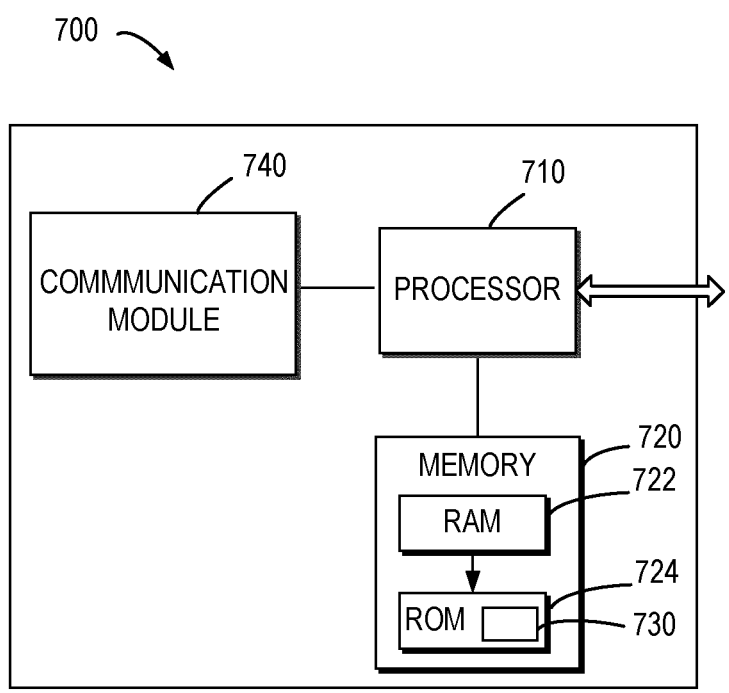
FIG. 7 illustrates a simplified block diagram of a device that is suitable for implementing example embodiments of the present disclosure and FIG. 8 illustrates a block diagram of an example computer readable medium in accordance with some example embodiments of the present disclosure.

FIG. 7 is a simplified block diagram of a device 700 that is suitable for implementing embodiments of the present disclosure. For example, the first device 110 and/or the second device 120 can be implemented by the device 700. As shown, the device 700 includes one or more processors 710, one or more memories 720 coupled to the processor 710, and one or more communication modules 740 coupled to the processor 710.

The communication module 740 is for bidirectional communications. The communication module 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 724. The processor 710 may perform any suitable actions and processing by loading the program 730 into the RAM 722.

The embodiments of the present disclosure may be implemented by means of the program 730 so that the device 700 may perform any process of the disclosure as discussed with reference to FIGS. 2-3 and 5-6. The embodiments of the present disclosure may also be implemented by hardware or by a combination of software and hardware.

Figure 8:
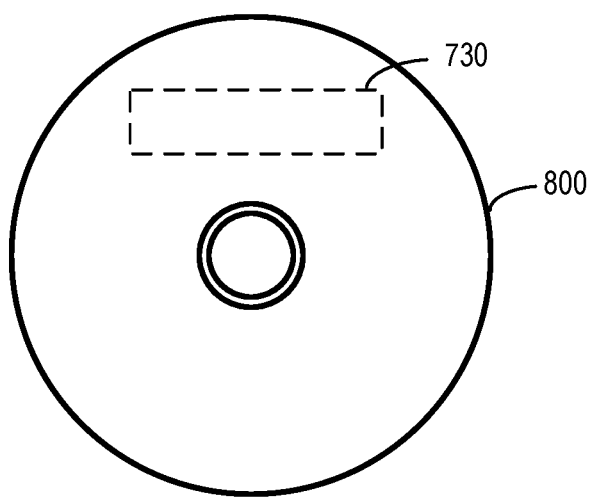

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 500 as described above with reference to FIG. 5 and/or the method 600 as described above with reference to FIG. 6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one memory including computer program codes;
   the at least one memory and the computer program codes are configured to, with the at least one processor, cause the first device at least to:
   transmit, to a second device, capability information indicating a capability of the first device to support different constellations for at least one of data transmission or data reception;
   receive, from the second device, configuration information indicating at least one constellation available for a modulation and coding scheme (MCS) based on the capability information;
   receive, from the second device, control information for a communication between the first device and the second device, the control information indicating the MCS; and
   perform the communication with the second device based on the control information using a constellation of the at least one constellation.

2. The first device of claim 1, wherein the configuration information indicates a correspondence of the at least one constellation to at least one of:
   a MCS index representing the MCS, or
   a Channel Quality Indicator, (CQI), index for deriving a MCS index representing the MCS.

3. The first device of claim 1, wherein the at least one memory and the computer program codes are configured to, with the at least one processor, further cause the first device to: select, from the at least one constellation, the constellation indicated in the control information for using in the communication.

4. The first device of claim 1, wherein the communication comprises transmission from the first device to the second device, and the at least one memory and the computer program codes are configured to, with the at least one processor, further cause the first device to: select the constellation from the at least one constellation autonomously for using in the communication.

5. The first device of claim 4, wherein the at least one memory and the computer program codes are configured to, with the at least one processor, further cause the first device to: transmit, to the second device, an indication of the selected constellation.

6. The first device of claim 1, wherein the at least one constellation is selected by the second device from a set of predefined constellations based on the capability information.

7. The first device of claim 1, wherein the at least one constellation is generated at the second device based on the capability information.

8. The first device of claim 1, wherein the capability information indicates a set of constellations supported at the first device and the at least one constellation is selected at the second device from the indicated set of constellations.

9. The first device of claim 1, wherein the first device is a terminal device and the second device is a network device serving the terminal device.

10. A second device comprising:
    at least one processor; and
    at least one memory including computer program codes;
    the at least one memory and the computer program codes are configured to, with the at least one processor, cause the second device at least to:
    receive, from a first device, capability information indicating a capability of the first device to support different constellations for at least one of data transmission or data reception;
    based on the capability information, transmit, to the first device, configuration information indicating at least one constellation available for a modulation and coding scheme (MCS);
    transmit, to the first device, control information for a communication between the first device and the second device, the control information indicating the MCS; and
    perform the communication with the first device based on the control information, a constellation of the at least one constellation being used in the communication.

11. The second device of claim 10, wherein the configuration information indicates a correspondence of the at least one constellation to at least one of:
    a MCS index representing the MCS, or
    a Channel Quality Indicator, CQI (CQI), index for deriving a MCS index representing the MCS.

12. The second device of claim 10, wherein the at least one memory and the computer program codes are configured to, with the at least one processor, cause the second device to transmit the control information by:
    selecting the constellation for using in the communication from the at least one constellation; and
    transmitting the control information comprising an indication of the selected constellation.

13. The second device of claim 10, wherein the communication comprises transmission from the first device to the second device, and the at least one memory and the computer program codes are configured to, with the at least one processor, further cause the second device to:
    receive, from the first device, an indication of the constellation selected from the at least one constellation at the first device.

14. The second device of claim 10, wherein the at least one memory and the computer program codes are configured to, with the at least one processor, further cause the second device to:

select the at least one constellation from a set of predefined constellations based on the capability information.

15. The second device of claim 10, wherein the at least one memory and the computer program codes are configured to, with the at least one processor, further cause the second device to:
generate the at least one constellation based on the capability information.

16. The second device of claim 10, wherein the capability information indicates a set of constellations supported by the first device and the at least one memory and the computer program codes are configured to, with the at least one processor, further cause the second device to:
select the at least one constellation from the indicated set of constellations.

17. The second device of claim 10, wherein the first device is a terminal device and the second device is a network device serving the terminal device.

18. A method comprising:
transmitting, to a second device from a first device, capability information indicating a capability of the first device to support different constellations for at least one of data transmission or data reception;

receiving, at the first device and from the second device, configuration information indicating at least one constellation available for a modulation and coding scheme (MCS) based on the capability information;

receiving, at the first device from the second device, control information for a communication between the first device and the second device, the control information indicating the MCS; and performing, by the first device, the communication with the second device based on the control information using a constellation of the at least one constellation.

* * * * *